(12) United States Patent
Park et al.

(10) Patent No.: US 9,809,460 B2
(45) Date of Patent: Nov. 7, 2017

(54) ELECTRICALLY CONDUCTIVE THIN FILMS CONTAINING RE2C

(71) Applicant: SAMSUNG ELECTRONICS CO., LTD., Suwon-si, Gyeonggi-do (KR)

(72) Inventors: Hee Jung Park, Daejeon (KR); Yoon Chul Son, Hwaseong-si (KR); Doh Won Jung, Seoul (KR); Woojin Lee, Suwon-si (KR); Jae-Young Choi, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 120 days.

(21) Appl. No.: 14/750,058

(22) Filed: Jun. 25, 2015

(65) Prior Publication Data

US 2016/0002051 A1    Jan. 7, 2016

(30) Foreign Application Priority Data

Jul. 4, 2014   (KR) .......................... 10-2014-0083822

(51) Int. Cl.
  *C01B 31/10*   (2006.01)
  *C01B 31/30*   (2006.01)
  *H01B 1/02*    (2006.01)

(52) U.S. Cl.
  CPC ............ *C01B 31/303* (2013.01); *C01B 31/10* (2013.01); *H01B 1/02* (2013.01); *Y10T 428/25* (2015.01); *Y10T 428/256* (2015.01)

(58) Field of Classification Search
  CPC .... C01B 31/10; Y10T 428/25; Y10T 428/256
  USPC .......................... 423/414, 439; 427/323, 328
  See application file for complete search history.

(56) References Cited

U.S. PATENT DOCUMENTS

| | | | | |
|---|---|---|---|---|
| 5,690,889 | A  * | 11/1997 | McCallum | ............ C01B 35/128 148/301 |
| 6,190,634 | B1 * | 2/2001  | Lieber | .................... B82Y 30/00 423/414 |
| 7,439,551 | B2   | 10/2008 | Hata | |
| 8,044,399 | B2   | 10/2011 | Hino et al. | |
| 8,119,254 | B2   | 2/2012  | Lee et al. | |
| 9,101,876 | B2 * | 8/2015  | Atanackovic | .......... B01D 53/02 |
| 2005/0064247 | A1 * | 3/2005 | Sane | ........................ C23C 16/36 428/698 |
| 2007/0258189 | A1 * | 11/2007 | Tano | ........................ C01B 31/02 361/305 |
| 2012/0012166 | A1 | 1/2012 | Atanackovic | |

(Continued)

FOREIGN PATENT DOCUMENTS

| KR | 10-0438330 B1 | 6/2004 |
|---|---|---|
| KR | 10-1065130 B1 | 9/2011 |

OTHER PUBLICATIONS

Chen et al., Fabrication of highly transparent and conductive Indium-Tin Oxide thin films with a high figure of merit via solution processing, Langmuir 2013, 29, 13836-13842.*

(Continued)

*Primary Examiner* — Holly Le
(74) *Attorney, Agent, or Firm* — Cantor Colburn LLP

(57) ABSTRACT

An electrically conductive thin film including a compound represented by Chemical Formula 1 and having a layered crystal structure $Re_2C$     Chemical Formula 1 wherein Re is a lanthanide. Also an electronic device including the electrically conductive thin film.

20 Claims, 6 Drawing Sheets

(56) References Cited

U.S. PATENT DOCUMENTS

2014/0219906 A1* 8/2014 Kim .................. C01B 31/0484
423/439
2015/0166340 A1* 6/2015 Son .................... C01G 23/043
428/220

OTHER PUBLICATIONS

Cunmao et al., "Second phase and electrode characteristics of rare-earth-based AB5+x alloys", Journal of Alloys and Compounds, vol. 231, 1995, pp. 546-549.
Diggs et al., "Magnetic properties of carbon-coated rare-earth nanocrystallites produced by a carbon arc method", J. Appl. Phys., vol. 75, No. 10, May 15, 1994, pp. 5879-5881.
Spedding et al., "The Crystal Structures of Some of the Rare Earth Carbides", Crystal Structures of Rare Earth Carbides, vol. 80, Sep. 5, 1958, pp. 4499-4503.

* cited by examiner

ELECTRICALLY CONDUCTIVE THIN FILMS CONTAINING RE2C

CROSS REFERENCE TO RELATED APPLICATIONS

This application claims priority to and the benefit of Korean Patent Application No. 10-2014-0083822, filed in the Korean Intellectual Property Office on, Jul. 4, 2014, and all the benefits accruing therefrom under 35 U.S.C. §119, the entire contents of which are incorporated herein by reference.

BACKGROUND

1. Field

Electrically conductive thin films and an electronic device including the same are disclosed.

2. Description of the Related Art

An electronic device like a flat panel display such as LCD or LED, a touch screen panel, a solar cell, a transparent transistor, and the like includes an electrically conductive thin film or a transparent electrically conductive thin film. A material for an electrically conductive thin film may desirably have, for example, high light transmittance of greater than or equal to about 80% in a visible light region, and low specific resistance of less than or equal to about $1 \times 10^{-4}$ Ωcm. Currently available materials for an electrically conductive thin film include indium tin oxide (ITO), tin oxide ($SnO_2$), zinc oxide (ZnO), and the like. The ITO as a transparent electrode material has poor flexibility and will inevitably cost more due to limited reserves of indium. Therefore, development of an alternative material is highly desired. Tin oxide ($SnO_2$) and the zinc oxide have low conductivity and have poor flexibility as well. Therefore, these materials find difficulties in being used for a flexible device, which has drawn growing attention as a next generation electronic device.

Therefore, development of a material having enhanced flexibility and being capable of substituting for these transparent electrode materials is needed.

SUMMARY

An embodiment provides an electrically conductive thin film having high conductivity and excellent light transmittance.

Another embodiment provides an electronic device including the electrically conductive thin film.

In an embodiment, an electrically conductive thin film includes a sub-carbide compound represented by Chemical Formula 1 and having a layered crystal structure:

$$Re_2C \qquad \text{Chemical Formula 1}$$

wherein Re is a lanthanide.

The electrically conductive thin film may have transmittance of greater than or equal to about 80% for light at a wavelength range of 550 nanometers (nm) at a thickness of 10 nm.

In Chemical Formula 1, Re may include La, Ce, Nd, Tb, Dy, or Ho.

The electrically conductive thin film may have electrical conductivity of greater than or equal to about 500 Siemens per centimeter (S/cm).

The compound may have a product of an absorption coefficient (α) for light having a wavelength of 550 nm at 25° C. and a resistivity value (ρ) thereof of less than or equal to about 30 ohms per square (Ω/□).

The layered crystal structure may belong to a rhombohedral system with an R$\bar{3}$m (166) space group.

The electrically conductive thin film may have a thickness of less than or equal to about 100 nm.

The electrically conductive thin film may include a plurality of nanosheets including the compound, wherein adjacent nanosheets of the plurality of nanosheets contact each other to provide an electrical connection.

The electrically conductive thin film may include a continuous deposition film including the compound.

Another embodiment provides an electronic device including an electrically conductive thin film including a compound represented by Chemical Formula 1 and having a layered crystal structure:

$$Re_2C \qquad \text{Chemical Formula 1}$$

wherein Re is a lanthanide.

The electronic device may be a flat panel display, a touch screen panel, a solar cell, an e-window, an electrochromic mirror, a heat mirror, a transparent transistor, or a flexible display.

The aforementioned embodiments may provide a transparent and electrically conductive thin film having electrical conductivity comparable to or greater than that of the ITO, and enhanced light transmittance.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
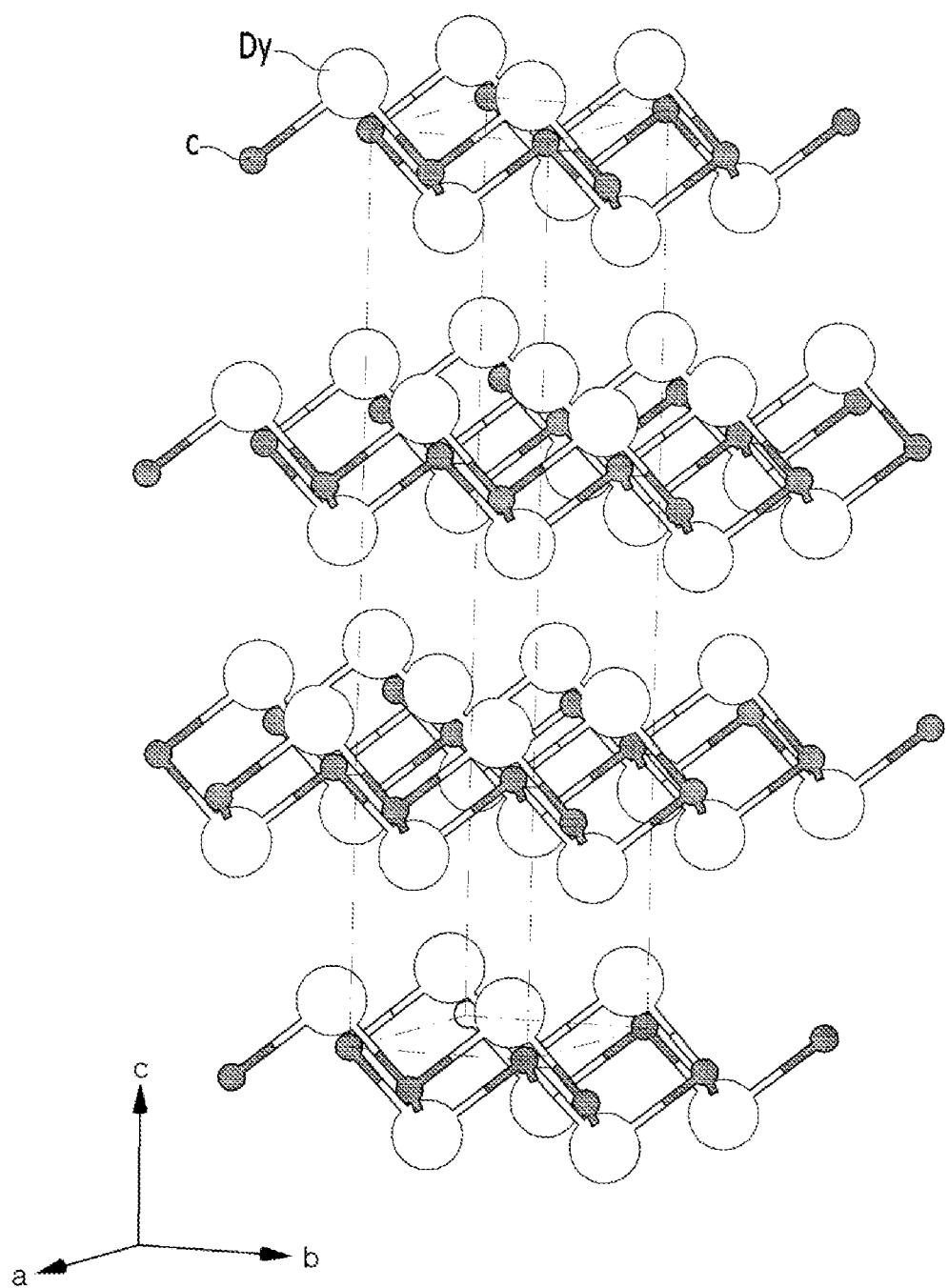
FIG. 1 is a view schematically illustrating a crystal structure of $Dy_2C$.

Advantages and characteristics of this disclosure, and a method for achieving the same, will become evident referring to the following exemplary embodiments together with the drawings attached hereto. However, this disclosure may be embodied in many different forms and is not be construed as limited to the embodiments set forth herein; rather, these embodiments are provided so that this disclosure will be thorough and complete, and will fully convey the scope of the invention to those skilled in the art. Like reference numerals refer to like elements throughout. Therefore, in some embodiments, well-known process technologies are not explained in detail in order to avoid vague interpretation of the present invention. If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising" will be understood to imply the inclusion of stated elements but not the exclusion of any other elements.

Further, the singular includes the plural unless mentioned otherwise.

In the drawings, the thickness of layers, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations. As used herein, the term "sub-carbide" refers to a class of carbides wherein the electropositive element (e.g., a metal element) is in excess relative to the "normal" carbides.

The "lanthanide elements" means the chemical elements with atomic numbers 57 to 71.

In an embodiment, an electrically conductive thin film includes a sub-carbide compound represented by Chemical Formula 1 and having a layered crystal structure:

$$Re_2C \quad \text{Chemical Formula 1}$$

wherein Re is a lanthanide.

The electrically conductive thin film may be a transparent conductive thin film. The electrically conductive thin film may a thickness of less than or equal to about 100 nanometers (nm), for example, less than or equal to about 10 nm, about 0.01 nm to about 10 nm, about 0.1 nm to about 8 nm, or about 0.5 nm to about 6 nm. In Chemical Formula 1, Re may be La, Ce, Nd, Tb, Dy, or Ho. In another embodiment, Re may be La, Ce, Nd, Tb, Dy, Ho, or combination thereof. In an embodiment, the electrically conductive thin film may include $La_2C$, $Ce_2C$, $Nd_2C$, $Tb_2C$, $Dy_2C$, $Ho_2C$, or a combination thereof.

The sub-carbide compound having a layered crystal structure and being represented by Chemical Formula 1 may provide high electrical conductivity, and may also exhibit high transmittance when it is prepared as a thin film having a small (e.g., a nanometer) thickness. In an embodiment, the electrically conductive thin film may have an electrical conductivity of greater than or equal to about 500 Siemens per centimeter (S/cm), for example, greater than or equal to about 700 S/cm, greater than or equal to about 1000 S/cm, greater than or equal to about 1500 S/cm, greater than or equal to about 2000 S/cm, greater than or equal to about 3000 S/cm, greater than or equal to about 4000 S/cm, greater than or equal to about 5000 S/cm, greater than or equal to about 6000 S/cm, greater than or equal to about 7000 S/cm, greater than or equal to about 8000 S/cm, or greater than or equal to about 9000 S/cm, about 500 S/cm to about 10,000 S/cm, or about 1000 S/cm to about 5,000 S/cm. In an embodiment, the electrically conductive thin film may provide further increased electrical conductivity when it includes a monocrystalline compound represented by Chemical Formula 1. In addition to the high electrical conductivity, the electrically conductive thin film may exhibit light transmittance of greater than or equal to about 80%, about 80% to about 99%, about 85% to about 98%, or about 90% to about 97%, at a thickness of 10 nm or less. According to a computational simulation analysis of these compounds, they may show a transmittance of greater than or equal to about 90% at a thickness of about 2 to 3 nm. In another embodiment, the electrically conductive thin film may exhibit light transmittance of greater than or equal to about 80%, about 80% to about 99%, about 85% to about 98%, or about 90% to about 97%, at a thickness of 2 nm.

The electrically conductive thin film including the aforementioned sub-carbide compound may have high electrical conductivity comparable to or greater than that of the ITO (e.g., about 5000 S/cm or greater). Without being bound to any theory, the electrically conductive thin film is understood to include a high density of electrons confined within its unit structure layer and thus may provide improved electrical conductivity.

The compound has a layered crystal structure, which includes two or more layers of metal atoms within its unit structure. FIG. 1 schematically shows a crystal structure of dysprosium carbide ($Dy_2C$). Referring to FIG. 1, the unit structure may have top and bottom layers of a lanthanide, e.g., dysprosium, and an intermediate layer of carbon between the lanthanide layers. In other words, the lanthanide, e.g., dysprosium, (as a cation) and the carbon (as an anion) are present in the outer layer and the inner layer, respectively. Within the layered crystal structure including such a unit structure layer, the layers of the lanthanide cation face each other and are bonded via the van der Waals force.

Figure 2:
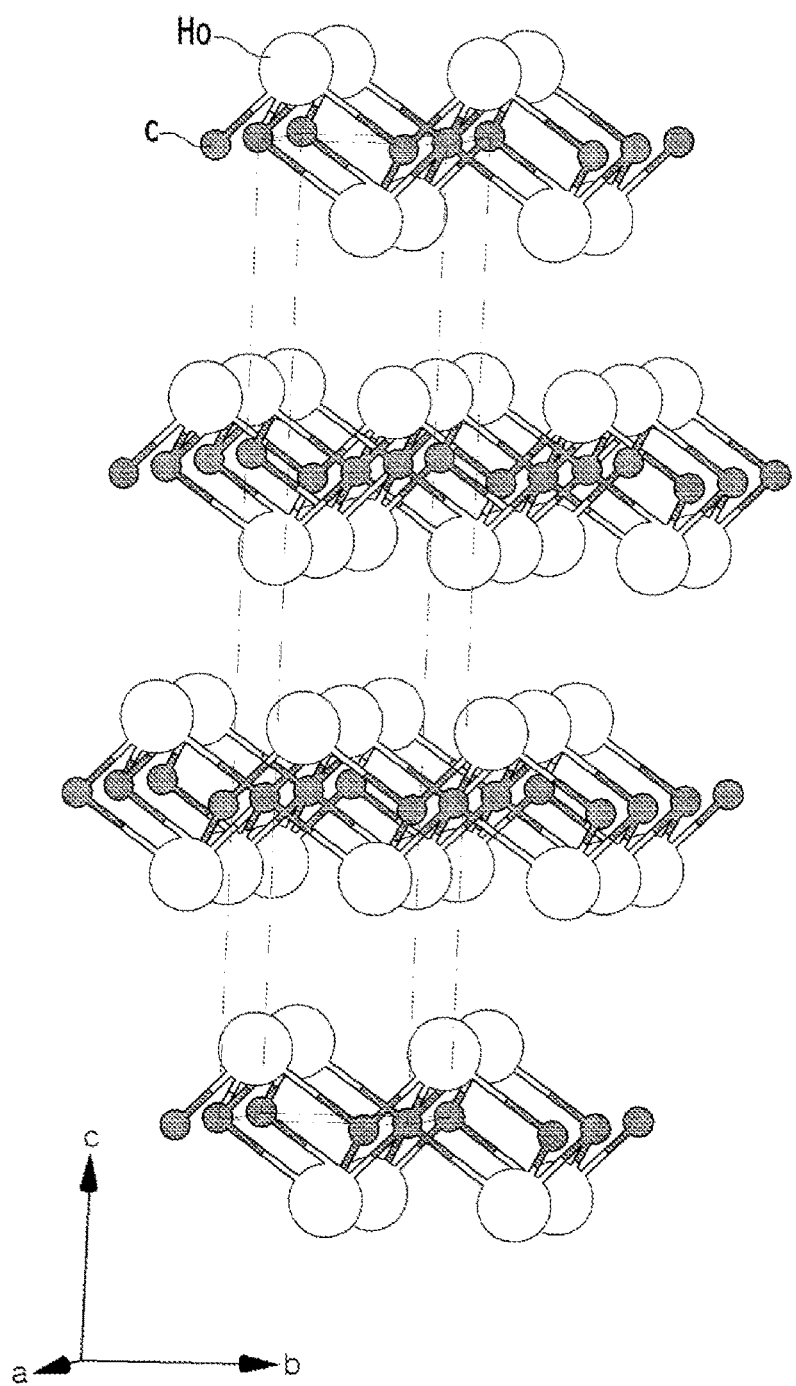
FIG. 2 is a view schematically illustrating a crystal structure of $Ho_2C$.

FIG. 2 schematically shows a crystal structure of holmium carbide ($Ho_2C$). Referring to FIG. 2, the unit structure may have top and bottom layers of the lanthanide, e.g., holmium, and an intermediate layer of carbon between the lanthanide layers. In other words, the lanthanide (as a cation) and the carbon (as an anion) are present in the outer layer and the inner layer, respectively. Within the layered crystal structure including such a unit structure layer, the layers of the lanthanide cation face each other and are bonded via the van der Waals force. Therefore, the sheet-like (i.e., two-dimensional) unit structure layers of the sub-carbide compound are bound with each other via the van der Waals force. While not wanting to be done by theory, the sheet-like layered structure enables inter-layer sliding. As a result, the electrically conductive thin film may provide enhanced flexibility in comparison with an ITO thin film. Therefore, the thin film including the sub-carbide compound according to Chemical Formula 1 may be used as a flexible transparent conductive film (e.g., a transparent electrode) when it is disposed on a flexible and transparent substrate. In addition, the sub-carbide compound may be prepared in the form of nanosheets via interlayer exfoliation (as explained further below), and the nanosheets thus prepared may be used to prepare an electrically conductive thin film.

Various efforts have been made to develop a flexible transparent electrode material having high electrical conductivity and being transparent in the visible ray range. Metals may have high electron density and high electrical conductivity. However, most metals, except some noble metals such as Au, Ag, and Pt, tend to react with oxygen in air to form an oxide on its surface and thus show greatly reduced electrical conductivity. There was an attempt to reduce surface contact resistance using a ceramic material having good conductivity and showing reduced surface oxidation. However, the currently available conductive ceramic materials (such as ITO) suffer from unstable supply of raw materials. Moreover, they may hardly provide electrical conductivity comparable to that of a metal and their flexibility tends to be poor. Since graphene prepared by exfoliation of graphite is known to have high electrical conductivity, there have been attempts to use the graphene as a material that may substitute for the indium thin oxide (ITO) having poor mechanical properties. However, the graphene has a high absorption coefficient. Transition metal dichalcogenides having a layered crystal structure may show comparable transmittance when prepared as a thin film, but they have semiconductor properties and thus have insufficient electrical conductivity to be used as an electrically conductive film.

By contrast, the electrically conductive film including the sub-carbide compound according to Chemical Formula 1 provides an electrical conductivity that is comparable to that of metals and high transparency at the same time. In particular, the electrically conductive film may provide enhanced flexibility and thus may be used as a flexible electronic device.

In some embodiments, the aforementioned sub-carbide compounds included in the electrically conductive thin film may have a product of an absorption coefficient ($\alpha$) for light having a wavelength of 550 nm at 25° C. and a resistivity value ($\rho$) thereof that is less than or equal to about 30Ω/□. The absorption coefficient and the resistivity can be obtained from a computer simulation. The resistivity ($\rho$) is obtained by calculating the density of state ("DOS") and the band structure around the Fermi level from the crystal structure of the corresponding rare earth element chalcogenide compounds. In addition, the absorption coefficient ($\alpha$) for a certain wavelength is calculated from the dielectric constant of the compound that is obtained by applying the Drude model and considering electron transition due to interband transition. As to simulation methodology for providing the absorption coefficient ($\alpha$) and the resistivity ($\rho$), it is possible to further refer to the Vienna Ab-initio Simulation Package (written by Georg Kresse and Jurgen Furthmuller, Institut fur Materialphysik, Universitat Wien, Sensengasse 8, A-1130 Wien, Austria, Aug. 24, 2005, http://cms.mpi.univie.ac.at/VASP/), which is incorporated herein by reference in its entirety. The aforementioned simulation procedures can be summarized as in Table 1.

TABLE 1

| Calculation | Simulation level | Calculation/simulation |
|---|---|---|
| Atom electron structure | DFT | Structure optimization Band structure calculation |
| Conductive characteristic | Semi-classical Boltzmann transport (const. $\tau$) | Intraband transition $\sigma \approx (e^2/4\pi^3) \tau \int dk\, v(k) v(k) (-\partial f/\partial \epsilon) = ne^2 \tau/m_{eff} = ne\, \mu$ $\rho = 1/\sigma$ |
| Dielectric characteristic | DFPT + Drude model | Interband transition $\epsilon(\omega) = \epsilon_D(\omega) + \epsilon_B(\omega) = \epsilon_1(\omega) + i\epsilon_2(\omega)$ |
| Optical characteristic Calculate $\rho\, \alpha$ | Ray optics | $n(\omega) = i\, k(\omega) + \epsilon(\omega)^{1/2}$ Absorption coeff. $\alpha = 4\pi\, k/\lambda$ |

DFT: density-functional theory
DFPT: density-functional perturbation theory
Drude model: free electron model for a solid
$\sigma$, $\tau$, $m_{eff}$, $\mu$, $\rho$: electrical conductivity, relaxation time, effective mass, mobility, resistivity
$\omega_p$ ($\omega_p'$): (screened) plasma frequency Hereinbelow, Table 1 is explained in further detail.

In order to calculate a quantum mechanical state of a material, the first-principles calculation (a calculation made from a fundamental equation without using extrinsic parameters) based on the density-functional-theory (DFT) method (a method of solving a quantum mechanical equation by describing the electron distribution using an electron density function instead of a wave function) is performed to calculate the quantum mechanical state of an electron. The VASP (the Vienna Ab initio simulation package code, which is the first principle DFT code) is used to calculate the electron state. A candidate material group including a two-dimensional electron gas layer is selected from the Inorganic Crystal Structure Database (ICSD). The atomic structure information for the candidate material is input and the energy level of the electrons is calculated by simulation, and for such electrons, an energy density function and a state density function on a k-space of the electrons are calculated.

The electron structure calculated through the DFT computer simulation provides an E-k diagram (the band structure) and DOS (Density of State: electron state density, electron state density function per energy unit) information, making it possible to determine whether the given material is a metallic conductive material ($DOS(E_F)>0$) or a semiconductor material ($DOS(E_F)=0$) depending on the presence of the DOS on the maximum energy level ($E_F$) available to the electrons.

In order to predict the conductivity ($\sigma$) of a metallically conducting material, its conductive characteristics are estimated by introducing a semi-classical Boltzmann transport model. In this case, relaxation time of electrons ($\tau$: duration during which an electron can move without collision) is assumed to be constant (see Ashcroft and Mermin, Solid State Physics).

$$\sigma = (e^2/4\pi^3)\tau \int dk\, v(k)v(k)(-\partial f/\partial E) \qquad \text{Boltzmann-Transport}$$

Herein, is a relaxation time of an electron, k is a state of the electron in the k-space, v(k) is a speed of the electron in the k state, f is the Fermi-Dirac distribution function, and E is energy. In this case, v(k) may be calculated from the E-k diagram, and σ/τ may be obtained from the above formula.

The mechanism for determining the transmittance absorption of the conductive material may include intraband absorption due to plasma-like oscillation of free electrons and intraband absorption due to band-to-band transition of bound electrons. The quantum computational simulation process considering each of the mechanisms may be obtained by the process as set forth in Table 2 (see Ashcroft and Mermin, Solid State Physics).

TABLE 2

| STEP | Category | Calculation | Results | Method (tool) |
|---|---|---|---|---|
| 1 | Optical simulation | Interband transition | $\epsilon B(w) = \epsilon B1(w) + i \epsilon B2(w)$ | DFT (VASP) |
| 2 | Optical simulation | Plasma frequency intraband transition | $\epsilon D(w) = \epsilon D1(w) + i \epsilon D2(w)$ | Boltzmann transport DFT (VASP) or post-processing |
| 3 | Optical simulation | Total dielectric constant refractive index | | Post-processing |
| 4 | Optical simulation | Reflectance absorption coefficient | Plasma freq. reflectance absorption co. transmittance | Post-processing |

Herein, B denotes a band, and D denotes a Drude model.

In this case, the relationships of the dielectric constant ($\in$), the refractive index (n), and the absorption coefficient (α) of a solid are shown as follows. For the dielectric constant, both the interband transition related portion ($\in_{Band}$) (Band)) and the intraband transition related portion ($\in_{(Drude)}$) should be considered.

$$\in(\omega) = \in_{(Drude)} + \in_{(Band)}$$

$$= \in_1(\omega) + i \in_2(\omega) \quad \text{dielectric function}$$

$$(n+ik)^2 = \in(\omega) \quad \text{refraction function}$$

$$\alpha(\omega) = 4\pi k/\lambda \quad \text{absorption coefficient}$$

As set forth in the above conductivity calculation, the interband absorption may be calculated through the band structure as calculated in advance while the intraband absorption by the free electrons is calculated by the simulation as below through the conductivity and optical coefficient calculation based on the Drude modeling (see Jinwoong Kim, Journal of Applied Physics 110, 083501 2011).

CGS UNIT $$\sigma(\omega) = \sigma_0/[1 - i\omega\tau] \quad \text{AC conductivity}$$

$$\sigma_g = ne^2\tau/m \quad \text{DC conductivity}$$

$$\varepsilon(\omega) = 1 + i(4\pi/\omega)\sigma(\omega)$$

$$\omega_p^2 \tau = \sigma_0/s_0 \quad (si)$$

$$= 4\pi\sigma_0 \quad (cgs)$$

-continued $$\varepsilon(\omega) = 1 + i(4\pi/\omega)\sigma_0/[1 - i\omega\tau]$$
$$= 1 - (4\pi\sigma_0/\omega)/[i + \omega\tau]$$
$$= 1 - (4\pi\sigma_0/\omega)(-i + \omega\tau)/[1 + (\omega\tau)^2]$$
$$= 1 - (\omega_p\tau)^2/[1 + (\omega\tau)^2] + i(\omega_p\tau)^2/[\omega\tau(1 + (\omega\tau)^2)]$$

$$\epsilon_1 = 1 - \frac{\omega_p^2 \tau^2}{1 + \omega^2 \tau^2} \quad n = \frac{1}{\sqrt{2}}\left(\epsilon_1 + (\epsilon_1^2 + \epsilon_2^2)^{\frac{1}{2}}\right)^{\frac{1}{2}}$$

$$\epsilon_2 = \frac{\omega_p^2 \tau^2}{\tau\omega(1 + \omega^2 \tau^2)} \quad \kappa = \frac{1}{\sqrt{2}}\left(-\epsilon_1 + (\epsilon_1^2 + \epsilon_2^2)^{\frac{1}{2}}\right)^{\frac{1}{2}}$$

ω: frequency
$\omega_p$: plasma frequency
k: extinction coefficient

As such, the calculation of the interband absorption and the intraband absorption makes it possible to calculate the dielectric function of the given material, and the optical constants thereof can be simulated therefrom. In the end, the reflectance (R), the absorption coefficient (a), and the transmittance (T) of the given material can be calculated therefrom.

In accordance with the foregoing method, the resistivity (ρ), the absorption coefficient (α), a product thereof, t max, and sheet resistance for scandium sub-carbide, yttrium sub-carbide, and lanthanum sub-carbide are compiled in Table 3, respectively.

TABLE 3

| Composition | ρ (Ω · cm) | α (1/cm) | t_max (nm) | Rs(Ω/□) (@ T = 90 %) |
|---|---|---|---|---|
| Sc6C3 | 7.75E-05 | 3.2E + 05 | 3.290 | 235.6 |
| Y6C3 | 7.00E-05 | 2.8E + 05 | 3.744 | 187.1 |
| La6C3 | 3.23E-05 | 3.2E + 05 | 2.221 | 145.7 |

In Table 3, the product of resistivity (ρ) and absorption coefficient (α) may represent the product of sheet resistance ($R_s$) and transmittance (ln T) according to the equation. Accordingly, the compound having a lower value of ρ*α may be advantageous for a material of the electrically conductive thin film.

$$e^{\alpha t} = T(\text{i.e.,} \alpha t = -\ln T)$$

$$R_s = \rho/t$$

$$\therefore \rho^*\alpha = R_s^*(-\ln T)$$

α: absorption coefficient
ρ: resistivity
T: transmittance (at λ=550 nm)
t: thickness
Rs: sheet resistance In an embodiment, the compound included in the electrically conductive thin film may have a product of resistivity (ρ) and absorption coefficient (α) (i.e., $R_s^*(-\ln T)$) that is less than or equal to about 30, for example, less than or equal to about 20, and therefore may provide an electrically conductive thin film having high conductivity and enhanced transparency (i.e., low sheet resistance and high light transmittance).

According to an embodiment, the electrically conductive thin film may be produced by preparing a raw material of the sub-carbide compound represented by Chemical Formula 1, a polycrystalline or monocrystalline bulk material prepared from the same, or a powder obtained from the bulk material, and conducting an appropriate method such as vapor deposition and the like with the raw material, the prepared bulk material, or a powder thereof to form a conductive thin film (e.g., a transparent conductive layer). Alternatively, the electrically conductive thin film may be obtained by liquid phase exfoliation (LPE) of the bulk material powder to provide nanosheets and forming the obtained nanosheets into a thin film.

The raw material of the sub-carbide compound may include each element and a compound including the each element. For example, the raw material may include carbon (e.g., graphite) and at least one of a La element, a Ce element, a Nd element, a Tb element, a Dy element, and a Ho element.

The polycrystalline bulk material may be prepared from the above raw material (e.g., a mixture of a metal powder and a graphite powder at a ratio of 2:1) using a quartz ampoule method, an arc melting method, a solid-state reaction method, and the like. For example, the quartz ampoule method includes introducing the raw material into a quartz tube or an ampoule made of a metal, sealing the same under vacuum, and heating the same to perform a solid-phase reaction or a melting process. The arc melting method includes introducing a raw material element into a chamber, performing an arc discharge process under an inert gas (e.g., nitrogen, argon, etc.) atmosphere to melt the raw material element, and solidifing the same. In the arc melting method, the pellet is subjected to the arc melting upside down in order for the upper and lower surfaces of the pellet to be uniformly sintered. During the arc melting, a current of greater than or equal to about 50 amperes (A), for example, a current of about 200 A, may be applied, but it is not limited thereto. The solid-state reaction method may include mixing and optionally pelletizing the raw material powder, heat-treating and optionally pelletizing an obtained mixture or an obtained pellet, and sintering the same.

The obtained polycrystalline bulk material may be subjected to a sintering process to be prepared as a highly densified product. Such a densification process may be performed by a hot pressing method, a spark plasma sintering method, a hot forging method, or the like. The hot pressing method includes applying the pulverized compound into a mold having a predetermined shape, and forming the same at a high temperature of, for example, about 300° C. to about 800° C. under a high pressure of, for example, about 30 pascals (Pa) to about 300 megapascals (MPa). The spark plasma sintering method includes applying the pulverized compound with a high voltage current under a high pressure, for example, with a current of about 50 A to about 500 A under a pressure of about 30 MPa to about 300 MPa, to sinter the material within a short period of time. The hot forging method may include compressing and sintering the powder compound at a high temperature of, for example, about 300° C. to about 700° C.

The polycrystalline bulk material thus prepared may be subjected to pulverization to obtain a crystal powder. The pulverization may be conducted in any manner such as ball mill without any particular limitation. In some embodiments, the pulverized product may be sieved to produce a powder including particles having a certain size.

The obtained polycrystalline or monocrystalline bulk material is used as a target of vapor deposition to provide a thin continuous film (i.e., electrically conductive thin film) including the compound. The vapor deposition may be performed by a physical vapor deposition method such as thermal evaporation and sputtering, chemical deposition (CVD), atomic layer deposition (ALD), or pulsed laser deposition. The deposition may be performed using any known or commercially available apparatus. The deposition condition may vary with the types of the compound and the deposition method, but are not particularly limited.

According to another embodiment, the bulk material of the above compound or the powder thereof may be subjected to liquid phase exfoliation (LPE) to be prepared as a plurality of nanosheets, which are then brought into contact with each other so as to provide an electrical connection, providing an electrically conductive thin film.

In the liquid phase exfoliation, the bulk material or the powder thereof may be subjected to ultra-sonication in an appropriate solvent. Examples of the solvent suitable for the liquid phase exfoliation may include, but are not limited to, water, an alcohol (e.g., isopropyl alcohol, ethanol, or methanol), N-methyl pyrrolidone (NMP), hexane, benzene, dichlorobenzene, toluene, chloroform, diethylether, dichloromethane (DCM), tetrahydrofuran (THF), ethylacetate (EtOAc), acetone, dimethyl formamide (DMF), acetonitrile (MeCN), dimethyl sulfoxide (DMSO), ethylene carbonate, propylene carbonate, γ-butyrolactone, γ-valerolactone, a perfluorinated aromatic solvent (e.g., hexafluorobenzene, octafluorotoluene, pentafluorobenzonitrile, and pentafluoropyridine), or a combination thereof.

The solvent may further include an additive such as a surfactant in order to facilitate the exfoliation and prevent the exfoliated nanosheets from being agglomerated. Examples of the surfactant may include sodium dodecyl sulfate (SDS) and sodium dodecyl benzenesulfonate (SDBS).

The ultrasonication may be performed by using any conventional or commercially available ultrasonication device, and the conditions thereof (e.g., ultrasonication time) are not particularly limited, but may be appropriately selected considering a solvent used and a powder concentration in the solvent. For example, the ultrasonication may be performed for greater than or equal to about 1 hour, for example, for about 1 hour to about 100 hours, but is not limited thereto. The powder concentration in the solvent may be greater than or equal to about 0.01 g/ml, for example, within a range from about 0.01 g/ml to about 1 g/l, but is not limited thereto.

In order to facilitate the exfoliation, lithium atoms may be intercalated into the compound having an interlayered crystal structure. According to an embodiment, the compound is immersed in an alky lithium compound (e.g., butyllithium) solution in an aliphatic hydrocarbon solvent such as hexane to intercalate lithium atoms into the compound, and the obtained product is subjected to ultrasonication to provide a plurality of nanosheets including the compound. For example, by putting the obtained product in water, water and the intercalated lithium ions may react to generate hydrogen between layers of the crystal structure, so as to accelerate the interlayer separation. The obtained nanosheets are separated according to an appropriate method (e.g., centrifugation) and washed.

In the electrically conductive thin film including the nanosheets (e.g., nanoflakes), the nanosheets physically contact one another to provide an electrical connection. When the nanosheets physically contact one another to form a film that is as thin as possible, the film thus formed may show more enhanced transmittance. The obtained film may have coverage of greater than or equal to about 50%.

The obtained film may have high transmittance (e.g., greater than or equal to about 80%, or greater than or equal to about 85%) when the thickness thereof is less than or equal to about 10 nm, for example, less than or equal to about 5 nm. The formation of the film using a nanosheet may be conducted in any known method. For example, the formation of the film may be performed by dip coating, spray coating, printing after forming an ink or a paste, and the like.

According to an embodiment, the manufactured nanosheets are added to deionized water, and the resultant dispersion is ultrasonicated again. An organic solvent that is not miscible with water (e.g., an aromatic hydrocarbon such as xylene or toluene) is added to the ultrasonicated dispersion. After the mixture thus obtained is shaken, a thin film including nanosheets is formed at the interface between the water and the organic solvent. When a clean, wetted, and oxygen plasma-treated glass substrate is slightly dipped to the interface and taken out, the thin film including nanosheets is spread out on the substrate at the interface. The thickness of the thin film may be adjusted by controlling a concentration of the nanosheets per area on the surface of the water/organic solvent and a speed/angle when the substrate is taken out.

The electrically conductive thin film shows high conductivity, enhanced light transmittance, and excellent flexibility, and thus may replace an electrode including a transparent conductive oxide such as ITO, ZnO, and the like and a transparent film including a Ag nanowire.

Another embodiment provides an electronic device including the above electrically conductive thin film. The electrically conductive thin film is the same as described above. The electronic device may include, for example, a flat panel display (e.g., LCD, LED, and OLED), a touch screen panel, a solar cell, an e-window, an electrochromic mirror, a heat mirror, a transparent transistor, or a flexible display, but is not limited thereto.

Figure 5:
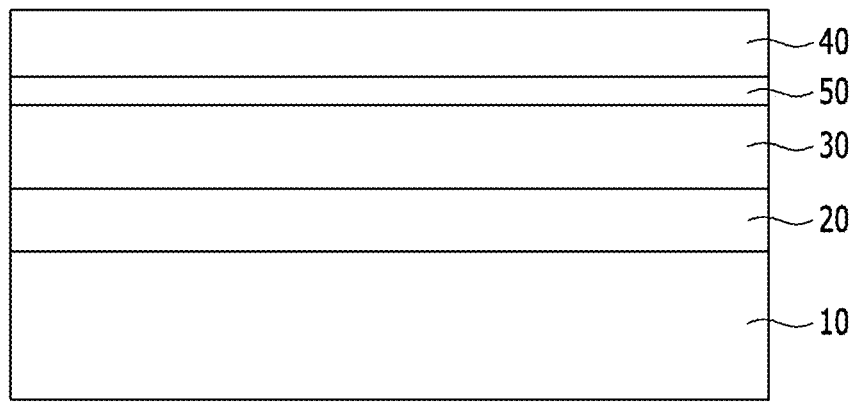
FIG. 5 is a cross-sectional view of an embodiment of an organic light emitting diode device including an electrically conductive thin film.

FIG. 5 is a cross-sectional view of an organic light emitting diode device including an electrically conductive thin film according to an embodiment.

An organic light emitting diode device according to an embodiment includes a substrate 10, a lower electrode 20, an upper electrode 40 facing the lower electrode 20, and an emission layer 30 interposed between the lower electrode 20 and the upper electrode 40.

The substrate 10 may be made of an inorganic material such as glass, or an organic material such as polycarbonate, polymethyl methacrylate, polyethylene terephthalate, polyethylene naphthalate, polyamide, polyethersulfone, or a combination thereof, or a silicon wafer.

One of the lower electrode 20 and the upper electrode 40 is a cathode and the other is an anode. For example, the lower electrode 20 may be an anode and the upper electrode 40 may be a cathode.

At least one of the lower electrode 20 and the upper electrode 40 may be a transparent electrode. When the lower electrode 10 is a transparent electrode, the organic light emitting diode device may have a bottom emission structure in which light is emitted toward the substrate 10, while when the upper electrode 40 is a transparent electrode, the organic light emitting diode device may have a top emission structure in which light is emitted away from the substrate 10. In addition, when the lower electrode 20 and upper electrode 40 are both transparent electrodes, light may be emitted toward the substrate 10 and away from the substrate 10.

The transparent electrode may be prepared from the above electrically conductive thin film. Details for the electrically conductive thin film are the same as set forth above. The electrically conductive thin film may show high electron density. The electrically conductive thin film may be used to replace the conventional LiF/Al or MgAg alloy.

The emission layer 30 may be made of an organic material inherently emitting one among three primary colors such as red, green, blue, and the like, or a mixture of an inorganic material with the organic material, for example, a polyfluorene derivative, a (poly)paraphenylene vinylene derivative, a polyphenylene derivative, a polyvinylcarbazole or its derivative, a polythiophene derivative, or a compound prepared by doping these polymer materials with a perylene-based pigment, a coumarin-based pigment, a rhodamine-based pigment, rubrene, perylene, 9,10-diphenylanthracene, tetraphenylbutadiene, Nile red, coumarin, quinacridone, and the like. An organic light emitting device displays a desirable image by a spatial combination of primary colors emitted by an emission layer therein.

The emission layer 30 may emit white light by combining basic colors such as three primary colors of red, green, and blue, and in this case, the color combination may emit white light by combining the colors of adjacent pixels or by combining colors laminated in a perpendicular direction.

An auxiliary layer 50 may be positioned between the emission layer 30 and the upper electrode 40 to improve luminous efficiency of the emission layer 30. In the drawing, the auxiliary layer 50 is shown only between the emission layer 30 and the upper electrode 40, but it is not limited thereto. The auxiliary layer 50 may be positioned between the emission layer 30 and the lower electrode 20, or between the emission layer 30 and the upper electrode 40 and between the emission layer 30 and the lower electrode 20.

The auxiliary layer 50 may include an electron transport layer (ETL) and a hole transport layer (HTL) for balancing between electrons and holes, an electron injection layer (EIL) and a hole injection layer (HIL) for reinforcing injection of electrons and holes, and the like. It may include one or more layers selected therefrom.

Figure 6:
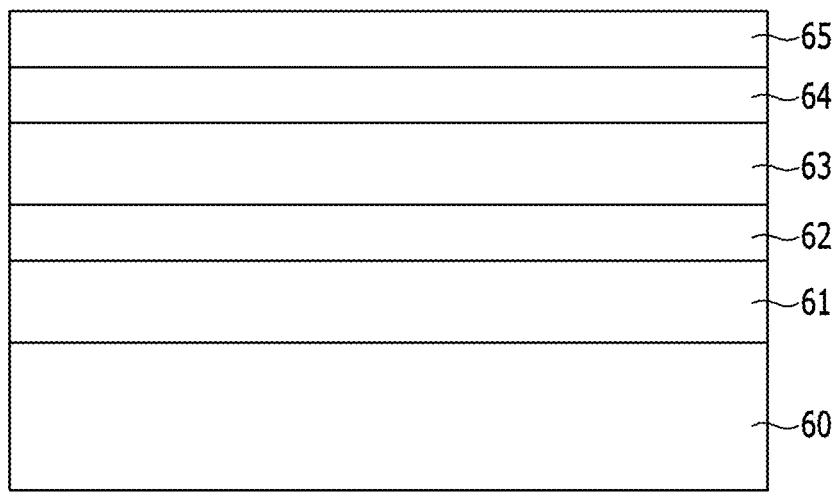
FIG. 6 is a cross-sectional view of an embodiment of a touch screen panel including an embodiment of an electrically conductive thin film.

In an embodiment, the electronic device may be a touch screen panel (TSP). Detailed structure of the TSP is known in the art. A schematically illustrated structure of the TSP is shown in FIG. 6. Referring to FIG. 6, the TSP may include a first transparent conductive film 61 on a display panel 60, a first transparent adhesive layer 62 (e.g., an optical clear adhesive film), a second transparent conductive film 63, a second transparent adhesive layer 64, and a window for a display device 65. The first transparent conductive film and/or the second transparent conductive film may be the aforementioned electrically conductive film.

Examples of applying the electrically conductive thin film to an organic light emitting diode device or a touch screen panel are illustrated above, but the electrically conductive thin film may be used as an electrode for all electronic devices including a transparent electrode without a particular limit, for example, a pixel electrode and/or a common electrode for a liquid crystal display (LCD), an anode and/or a cathode for an organic light emitting diode device, and a display electrode for a plasma display device.

Hereinafter, the embodiments are illustrated in more detail with reference to examples. These examples, however, are not in any sense to be interpreted as limiting the scope of this disclosure.

EXAMPLES

Preparation Example 1: Preparation of $Dy_2C$ Polycrystalline Sintered Body

In a glove box, 9.643 g of dysprosium (Dy) and 0.356 g of graphite are mixed and introduced into a metallic mold to be pressed using an uniaxial press, providing a pellet. The pellet is sintered using a vacuum arc melting apparatus (manufactured by Auto-tech, Korea, model name: AT-VAMS) as below.

The inside of the apparatus is made into a vacuum state of $10^{-3}$ atmospheres (atm) and argon gas is injected therein to make the same as an inert atmosphere. A current of 200 amperes (A) is applied to generate an arc and thereby the pellet is melted and the melted product is then solidified.

In order to sinter the top and bottom of the pellet uniformly, the pellet is mounted on the apparatus again while being turned upside down. Such an arc melting process is repeated twice or more. The polycrystalline sintered body of $Dy_2C$ is found to have a relative density of about 90% or higher.

Figure 3:
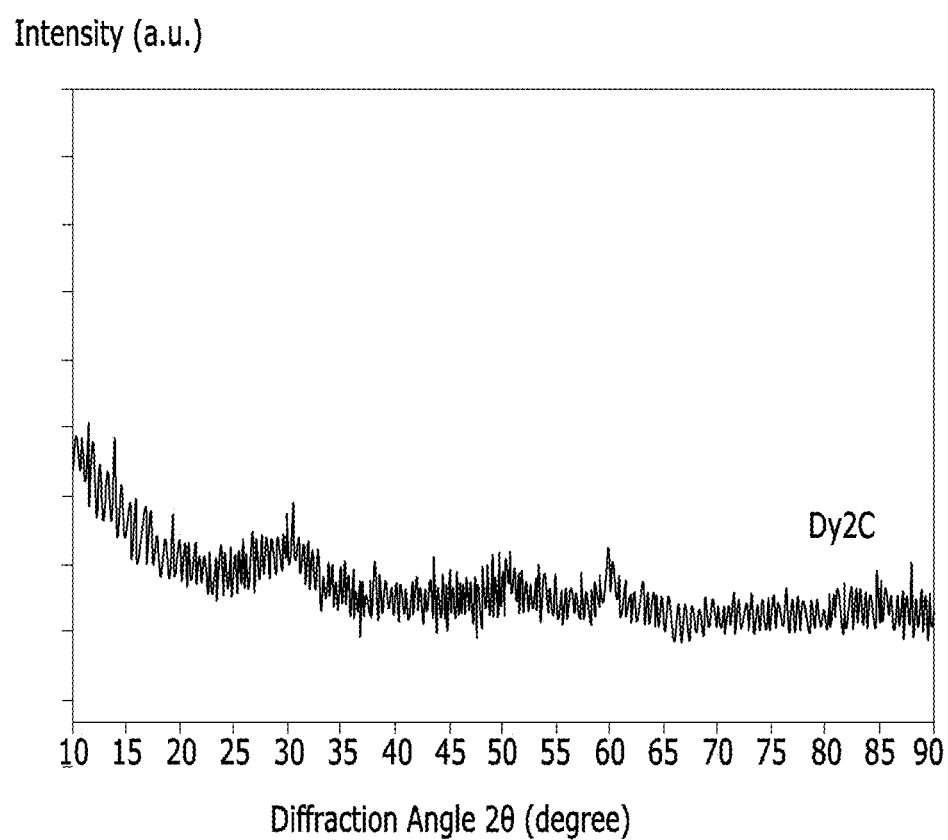
FIG. 3 is a graph of intensity (arbitrary units, a.u.) vs diffraction angle (2θ) and is an X-ray diffraction spectrum of a $Dy_2C$ sintered body synthesized in the preparation examples.

For some of the sintered bodies thus prepared, X-ray diffraction analysis is made to confirm crystal structures, and the results thereof are shown in FIG. 3. The results of FIG. 3 confirm the preparation of the polycrystalline sintered body of $Dy_2C$.

For the obtained sintered body, electrical conductivity is measured using ULVAC-Riko ZEM-3 equipment according to the DC 4 terminal method. The results are compiled in Table 4. The results of Table 4 confirm that the sintered body thus prepared has a high level of electrical conductivity.

Preparation Example 2: Preparation of $Ho_2C$ Polycrystalline Sintered Body

A $Ho_2C$ polycrystalline sintered body is prepared in the same manner set forth in Example 1, except that 9.648 g of holmium (Ho) and 0.351 g of graphite are mixed to form a pellet. The polycrystalline sintered body of $Ho_2C$ is found to have a relative density of about 90% or higher.

Figure 4:
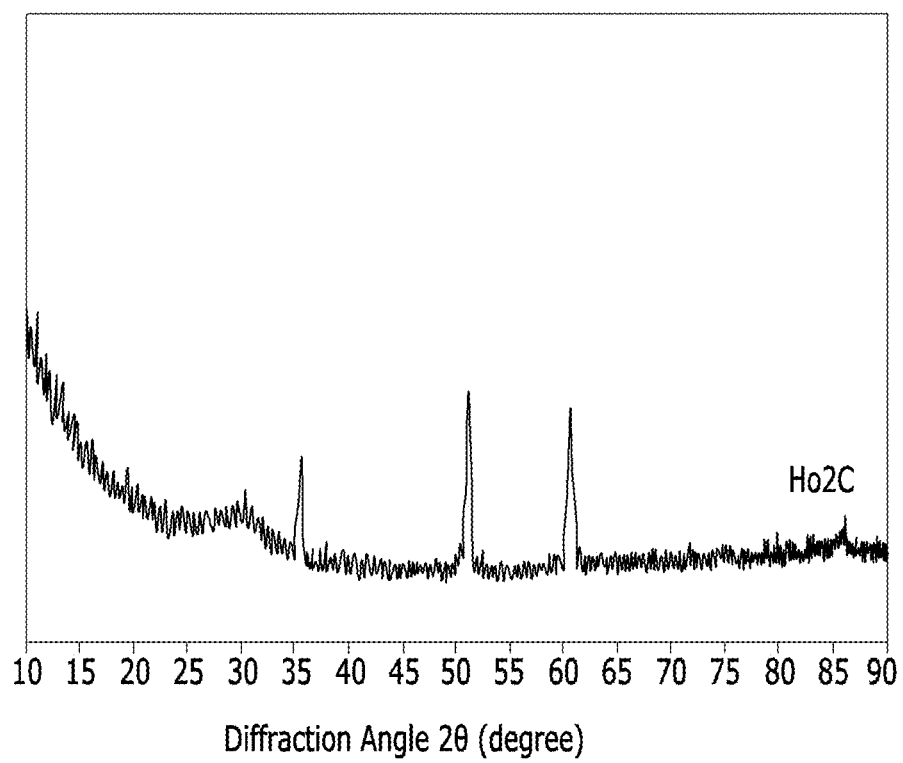
FIG. 4 is a graph of intensity (arbitrary units, a.u.) vs diffraction angle (2θ) and is an X-ray diffraction spectrum of a $Ho_2C$ sintered body synthesized in the preparation examples.

For some of the sintered bodies thus prepared, X-ray diffraction analysis is made to confirm crystal structures, and the results thereof are shown in FIG. 4. The results of FIG. 4 confirm the preparation of the polycrystalline sintered body of $Ho_2C$.

For the obtained sintered body, electrical conductivity is measured using ULVAC-Riko ZEM-3 equipment according to the DC 4 terminal method. The results are compiled in Table 4. The results of Table 4 confirm that the sintered body thus prepared has a high level of electrical conductivity.

Preparation Example 3: Preparation of $La_2C$ Polycrystalline Sintered Body

A $La_2C$ polycrystalline sintered body is prepared in the same manner set forth in Example 1, except that 9.585 g of lanthanum (La) and 0.414 g of graphite are mixed to form a pellet. The polycrystalline sintered body of $La_2C$ is found to have a relative density of about 90% or higher.

For the obtained sintered body, electrical conductivity is measured using ULVAC-Riko ZEM-3 equipment according to the DC 4 terminal method. The results are compiled in Table 4. The results of Table 4 confirm that the sintered body thus prepared has a high level of electrical conductivity.

Preparation Example 4: Preparation of $Ce_2C$ Polycrystalline Sintered Body

A $Ce_2C$ polycrystalline sintered body is prepared in the same manner set forth in Example 1, except that 9.589 g of cerium (Ce) and 0.411 g of graphite are mixed to form a pellet. The polycrystalline sintered body of $Ce_2C$ is found to have a relative density of about 90% or higher.

For the obtained sintered body, electrical conductivity is measured using ULVAC-Riko ZEM-3 equipment according to the DC 4 terminal method. The results are compiled in Table 4. The results of Table 4 confirm that the sintered body thus prepared has a high level of electrical conductivity.

Example 5

Preparation of $Nd_2C$ Polycrystalline Sintered Body

A $Nd_2C$ polycrystalline sintered body is prepared in the same manner set forth in Example 1, except that 9.600 g of neodymium (Nd) and 0.399 g of graphite are mixed to form a pellet. The polycrystalline sintered body of $Nd_2C$ is found to have a relative density of about 90% or higher.

For the obtained sintered body, electrical conductivity is measured using ULVAC-Riko ZEM-3 equipment according to the DC 4 terminal method. The results are compiled in Table 4. The results of Table 4 confirm that the sintered body thus prepared has a high level of electrical conductivity.

Example 6

Preparation of $Tb_2C$ Polycrystalline Sintered Body

A $Tb_2C$ polycrystalline sintered body is prepared in the same manner set forth in Example 1, except that 9.600 g of terbium (Tb) and 0.399 g of graphite are mixed to form a pellet. The polycrystalline sintered body of $Tb_2C$ is found to have a relative density of about 90% or higher.

For the obtained sintered body, electrical conductivity is measured using ULVAC-Riko ZEM-3 equipment according to the DC 4 terminal method. The results are compiled in Table 4. The results of Table 4 confirm that the sintered body thus prepared has a high level of electrical conductivity.

TABLE 4

| | Composition | Conductivity (S/cm) [polycrystalline] |
|---|---|---|
| Preparation Example 1 | $Dy_2C$ | 1800 |
| Preparation Example 2 | $Ho_2C$ | 720 |
| Preparation Example 3 | $La_2C$ | 9332 |
| Preparation Example 4 | $Ce_2C$ | 17789 |
| Preparation Example 5 | $Nd_2C$ | 7253 |
| Preparation Example 6 | $Tb_2C$ | 3012 |

Preparation Example of a Thin Film

Pulsed laser deposition (PLD) is conducted on an $Al_2O_3$ substrate under the following conditions using the $La_2C$ sintered body prepared from Preparation Example 3 as a target and using a Nd/YAG laser.
PLD device: PLD 5000 Deposition Systems, PVD Products
Output: 60 mJ/cm$^2$
Time: 20 min
Substrate temperature: 600° C.
Vacuum degree: $2*10^{-6}$ Pa
The obtained $La_2C$ deposition film has a thickness of about 20 nm.

The sub-carbide compounds prepared in the above examples have a layered crystal structure and may be prepared into a thin film having a small thickness. In addition, the thin film thus prepared may show enhanced light transmittance.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrically conductive thin film, comprising:
a compound represented by Chemical Formula 1 and having a layered crystal structure:

$$Re_2C \qquad \text{Chemical Formula 1}$$

wherein Re is a lanthanide, and
wherein the electrically thin film comprises a plurality of nanosheets including the compound represented by Chemical Formula 1, wherein adjacent nanosheets of the plurality of nanosheets contact one another to provide an electrical connection.

2. The electrically conductive thin film of claim 1, wherein the electrically conductive thin film has transmittance of greater than or equal to about 80% for light at a wavelength range of 550 nanometers at a thickness of 10 nanometers.

3. The electrically conductive thin film of claim 1, wherein Re comprises La, Ce, Nd, Tb, Dy, or Ho.

4. The electrically conductive thin film of claim 1, wherein the compound represented by Chemical Formula 1 has a product of an absorption coefficient for light having a wavelength of about 550 nm at 25° C. and a resistivity value thereof of less than or equal to about 30 ohms per square.

5. The electrically conductive thin film of claim 1, wherein the layered crystal structure belongs to a rhombohedral system with an $R\bar{3}m$ space group.

6. An electrically conductive thin film, comprising:
a compound represented by Chemical Formula 1 and having a layered crystal structure:

$$Re_2C \qquad \text{Chemical Formula 1}$$

wherein Re is a lanthanide and electrically conductive thin film comprises a continuous deposition film including the compound represented by Chemical Formula 1.

7. The electrically conductive thin film of claim 6, wherein the compound represented by Chemical Formula 1 has a product of an absorption coefficient for light having a wavelength of about 550 nm at 25° C. and a resistivity value thereof of less than or equal to about 30 ohms per square.

8. An electronic device comprising an electrically conductive thin film comprising a compound represented by Chemical Formula 1 and having a layered crystal structure:

$$Re_2C \qquad \text{Chemical Formula 1}$$

wherein Re is a lanthanide, and
wherein the electrically thin film comprises a plurality of nanosheets including the compound represented by Chemical Formula 1, wherein adjacent nanosheets of the plurality of nanosheets contact one another to provide an electrical connection.

9. The electronic device of claim 8, wherein the electrically conductive thin film has transmittance of greater than or equal to about 80% for light at a wavelength range of 550 nanometers at a thickness of 10 nanometers.

10. The electronic device of claim 8, wherein the Re comprises La, Ce, Nd, Tb, Dy, or Ho.

11. The electronic device of claim 8, wherein the compound represented by Chemical Formula 1 has a product of an absorption coefficient for light having a wavelength of about 550 nanometers at 25° C. and a resistivity value thereof of less than or equal to about 30 ohms per square.

12. The electronic device of claim 8, wherein the layered crystal structure belongs to a rhombohedral system with an $R\bar{3}m$ space group.

13. The electronic device of claim 8, wherein the electrically conductive thin film comprises a continuous deposition film including the sub-carbide compound.

14. The electronic device of claim 8, wherein the electrically conductive thin film comprises a plurality of nanosheets including the compound represented by Chemical Formula 1, wherein adjacent nanosheets of the plurality of nanosheets contact one another to provide an electrical connection.

15. The electronic device of claim 8, wherein the electronic device is a flat panel display, a touch screen panel, a solar cell, an e-window, an electrochromic mirror, a heat mirror, a transparent transistor, or a flexible display.

16. An electrically conductive thin film, comprising:
a compound represented by Chemical Formula 1 and having a layered crystal structure:

$$Re_2C \qquad \text{Chemical Formula 1}$$

wherein Re is a lanthanide, and
wherein the electrically conductive thin film has transmittance of greater than or equal to about 80% for light at a wavelength range of 550 nanometers at a thickness of 10 nanometers.

17. The electrically conductive thin film of claim 16, wherein Re comprises La, Ce, Nd, Tb, Dy, or Ho.

18. The electrically conductive thin film of claim 16, wherein the compound represented by Chemical Formula 1 has a product of an absorption coefficient for light having a wavelength of about 550 nm at 25° C. and a resistivity value thereof of less than or equal to about 30 ohms per square.

19. The electrically conductive thin film of claim 16, wherein the layered crystal structure belongs to a rhombohedral system with an $R\bar{3}m$ space group.

20. The electrically conductive thin film of claim 16, which comprises a continuous deposition film including the compound represented by Chemical Formula 1.

* * * * *